United States Patent [19]

Asayama

[11] Patent Number: 4,705,009

[45] Date of Patent: Nov. 10, 1987

[54] EXHAUST GAS RECIRCULATION CONTROL SYSTEM FOR AN ENGINE

[75] Inventor: Yoshiaki Asayama, Himeji, Japan

[73] Assignee: Mitsubishi Denki Kabushiki Kaisha, Tokyo, Japan

[21] Appl. No.: 916,146

[22] Filed: Oct. 7, 1986

[30] Foreign Application Priority Data

Oct. 9, 1985 [JP] Japan .................... 60-226527

[51] Int. Cl.$^4$ ............................ F02M 25/06
[52] U.S. Cl. .................... 123/571; 204/425
[58] Field of Search ............ 123/440, 489, 568, 569, 123/571, 589; 60/276, 278, 285; 204/424, 425, 426, 427, 428, 429

[56] References Cited

U.S. PATENT DOCUMENTS

| 4,005,689 | 2/1977 | Barnard | 60/278 X |
| 4,108,122 | 8/1978 | Barnard | 60/276 |
| 4,385,616 | 5/1983 | Kobayashi et al. | 123/571 |
| 4,409,949 | 10/1983 | Tanaka et al. | 123/571 |
| 4,426,987 | 1/1984 | Latsch et al. | 123/571 |
| 4,471,745 | 9/1984 | Yoshioka et al. | 123/571 |
| 4,578,172 | 3/1986 | Yamada et al. | 204/412 |
| 4,614,175 | 9/1986 | Asayama | 123/571 |

Primary Examiner—Willis R. Wolfe, Jr.
Attorney, Agent, or Firm—Sughrue, Mion, Zinn, Macpeak and Seas

[57] ABSTRACT

In an exhaust gas recirculation control system for an internal combustion engine, intake air at the same pressure as that of a mixed gas flowing in an intake duct 2 and free from the exhaust gas is introduced to a reference air chamber 5 of an oxygen sensor 4. Any detecting errors due to a pressure difference between the mixed gas in the intake duct and the reference gas in the air chamber are thus eliminated.

4 Claims, 2 Drawing Figures

EXHAUST GAS RECIRCULATION CONTROL SYSTEM FOR AN ENGINE

BACKGROUND OF THE INVENTION

This invention relates to an exhaust gas recirculation (EGR) control system for an internal combustion engine.

EGR systems are well known in the art, which essentially feed a portion of the exhaust gas back to the intake side of an engine to reduce the level of noxious and harmful nitrous oxide (NOx) emissions. Since the flow of the recirculated exhaust gas affects the performance and fuel consumption, etc., of the engine, however, in addition to reducing the NOx emission level, the exhaust gas feedback must be accurately controlled according to the operating conditions of the engine to optimally balance these offsetting features or characteristics.

After prolonged use an EGR control valve is subject to the buildup of carbon and other exhaust gas contaminants, which renders its control function inaccurate. U.S. Pat. No. 4,614,175 seeks to overcome this problem by providing a feedback control system having a sensor for detecting the oxygen concentration in the intake air/recirculated exhaust gas mixture, the exhaust gas feedback then being controlled in accordance with the sensor output since the oxygen concentration is proportional to the mixing ratio of the exhaust gas.

A suitable oxygen pump type sensor for such a system is described in U.S. Pat. No. 4,578,172. The sensor of this patent employs oxygen-ion-conductive solid electrolyte plates, and is provided with an oxygen pump element, an electric current detecting element disposed opposite the pump element with a gap between the two, and an atmospheric air chamber for establishing a reference for the pump element. Since the pump element pumps out oxygen in the gap, a difference in oxygen concentration between the mixed gas in the gap and the atmospheric air in the chamber is established such that the detecting element generates an electrical output signal proportional to such difference, and thus proportional to the inflow rate of the recirculated exhaust gas.

Although the pressure in the intake duct in which the mixed gas is flowing changes according to the operating conditions of the engine, the pressure in the reference air chamber does not change because of its atmospheric venting. This pressure discrepancy causes sensing errors which adversely affect the performance of the EGR system.

SUMMARY OF THE INVENTION

It is thus an object of the present invention to provide an EGR control system for an internal combustion engine which more accurately controls the recirculated exhaust gas by more accurately detecting the oxygen concentration in the mixed gas flowing in the intake duct. To accomplish this object a reference gas having substantially the same pressure as that of the mixed gas in the intake duct but free from any of the recirculated exhaust gas is introduced into the reference air chamber of the oxygen sensor. This eliminates the detection errors of the oxygen sensor in the prior art system caused by the difference in pressure between the reference gas in the air chamber and the mixed gas flowing in the intake duct.

DETAILED DESCRIPTION OF THE PREFERRED EMBODIMENTS

Figure 1:
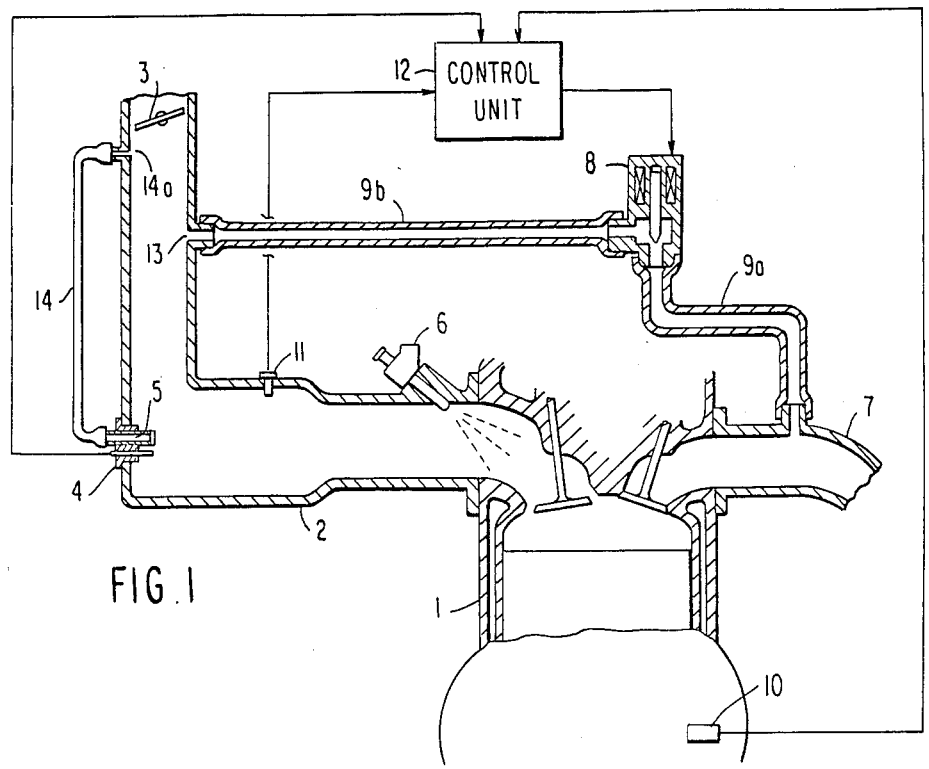
FIG. 1 is a cross-sectional elevation of a preferred embodiment of an EGR control system for an engine according to this invention.

FIG. 1 shows an internal combustion engine 1 having an intake duct or manifold 2 in which a throttle valve 3 is mounted. An oxygen sensor 4 is also mounted in the intake duct to detect the oxygen concentration of the mixed gas flowing through the duct, and a fuel injector 6 is provided for supplying fuel to the combustion chamber.

The oxygen sensor 4 is of the solid electrolyte oxygen pump type, and has a chamber 5 into which a reference gas is introduced. A sensor as disclosed in U.S. Pat. No. 4,578,172 can be utilized, for example. The engine 1 is also provided with an exhaust pipe or manifold 7 for discharging exhaust gases. An EGR control valve 8 is disposed between feedback tubing lines 9a and 9b connecting the exhaust duct 7 to the intake duct 2. The degree of opening of the valve 8 is electromagnetically controlled to adjust the flow rate of the exhaust gas recirculated from the exhaust duct to the intake duct to a desired value. The engine is also provided with a sensor 10 for detecting the rotational speed of the engine, and a pressure sensor 11 for detecting the pressure in the intake duct. An electronic control unit 12 for controlling the valve 8 receives input signals from the rotational speed sensor 10, the pressure sensor 11, and the oxygen sensor 4, and generates an output signal to drive the EGR control valve 8 according to the operating conditions of the engine as determined by the input signals such that the flow rate of the recirculated exhaust gas is oontrolled to the desired value.

An opening 13 for recirculating the exhaust gas and an opening 14a for introducing the reference gas to the air chamber 5 of the oxygen sensor 4 are provided in the intake duct 2. The opening 14a is located between the throttle valve 3 and the opening 13 so that only pure intake air, before any mixture with the recirculated exhaust gas, is introduced into the air chamber 5 of the oxygen sensor. Consequently, the intake air serving as a reference gas is introduced into the air chamber of the oxygen sensor through a tubing line 14 at a pressure essentially equal to the pressure of the mixed gas in the vicinity of the oxygen sensor 4.

In operation, when the engine 1 is initially started up intake air is drawn in from the atmosphere through an air cleaner (not shown), the throttle valve 3 and the intake duct 2. The recirculated exhaust gas is introduced into the intake duct from the exhaust pipe 7 through the line 9a, the control valve 8, the line 9b and the opening 13, and is mixed with the atmospheric intake air. The flow rate of the recirculated exhaust gas is subject to continuous and dynamic adjustment by the control valve 8 in accordance with, inter alia, the oxygen concentration detected by the sensor 4. More specifically, the electronic control unit 12 establishes a preset oxygen concentration value, corresponding to the predetermined EGR rate, according to the operating conditions of the engine on the basis of the output signals from the rotational sensor 10 and the pressure sensor 11, and compares the output of the oxygen sensor 4 with this preset value. The control unit 12 then adjusts the opening of the control valve 8 in accordance with the comparison result until the output signal of the sensor 4 matches the preset value, thus controlling the flow or feedback rate of the recirculated exhaust gas.

Since the reference gas is introduced into the air chamber 5 of the oxygen sensor directly from the intake duct 2, no pressure difference exists between the reference gas and the mixed gas in the intake duct. An accurate control of the recirculated exhaust gas can thus be realized because the detecting error of the oxygen sensor in the prior art systems due to the pressure difference is cancelled.

Figure 2:
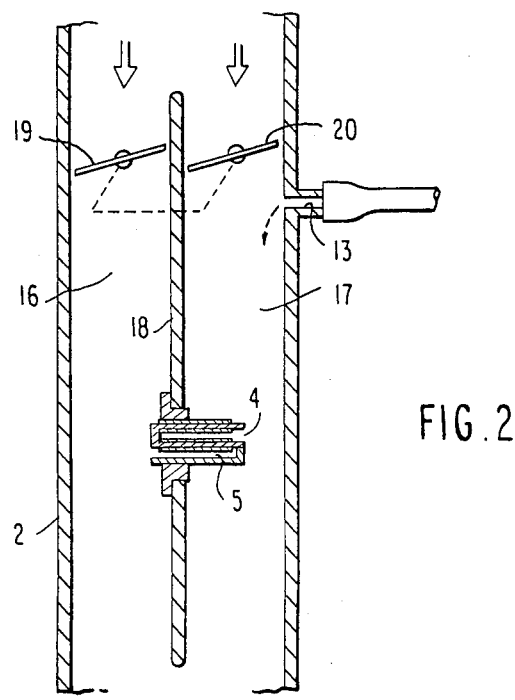
FIG. 2 is a cross-sectional elevation of a portion of a modified embodiment.

In the modification shown in FIG. 2 the intake duct 2 is divided into a first intake path 16 and a second intake path 17 by a central wall 18, and the opening 13 for introducing recirculated exhaust gas communicates with the second path 17. The oxygen sensor 4 is mounted on the wall 18 between the first and second paths, and its reference air chamber 5 is open to the first intake path 16 to implement the accurate detection of the oxygen concentration in the mixed gas flowing in the second intake path 17. Two throttle valves 19, 20 are mounted in the respective first and second intake paths 16, 17, and are ganged or linked together for concurrent movement. Of course, a single throttle valve could instead be mounted on the upstream side of the intake paths 16, 17, before their division by the wall 18.

What is claimed is:

1. An exhaust gas recirculation control system for an internal combustion engine, comprising:
   (a) an intake duct (2) for introducing intake air to the engine;
   (b) a throttle valve (3) mounted in said intake duct for controlling the flow rate of the intake air;
   (c) an exhaust pipe (7) for discharging exhaust gas from the engine;
   (d) conduit means (9a, 9b) for recirculating exhaust gas from said exhaust pipe back to said intake duct through an opening (13) therein disposed downstream of said throttle valve so that the recirculated exhaust gas is mixed with the intake air;
   (e) an exhaust gas recirculation control valve (8) operatively coupled in the conduit means for controlling the flow rate of the recirculated exhaust gas;
   (f) an oxygen sensor (4) mounted in said intake duct downstream of said opening for sensing the oxygen concentration in the mixed gas flowing in said intake duct;
   (g) a control unit (12) for controlling said control valve in response to the output of said oxygen sensor to adjust the exhaust gas recirculation rate to a desired value; and
   (h) means for introducing air as a reference gas to said oxygen sensor at substantially the same pressure as that of said mixed gas in said intake duct but free from any of said recirculated exhaust gas,
   (i) wherein said introducing means comprises a partition member (18) dividing said intake duct into a first flow path (16) for pure intake air and a second flow path (17) for the mixed gas; and said oxygen sensor is mounted on the partition member between said paths with a reference air chamber (5) of said sensor in open communication with said first path.

2. An exhaust gas recirculation control system for an internal combustion engine, comprising:
   (a) an intake duct (2) for introducing intake air to the engine;
   (b) a throttle valve (3: 19,20) mounted in said intake duct for controlling the flow rate of the intake air;
   (c) an exhaust pipe (7) for discharging exhaust gas from the engine;
   (d) conduit means (9a, 9b) for recirculating exhaust gas from said exhaust pipe back to said intake duct through an opening (13) therein disposed downstream of said throttle valve so that the recirculated exhaust gas is mixed with the intake air;
   (e) an exhaust gas recirculation control valve (8) operatively coupled in the conduit means for controlling the flow rate of the recirculated exhaust gas;
   (f) an oxygen sensor (4) mounted in said intake duct downstream of said opening for sensing the oxygen concentration in the mixed gas flowing in said intake duct;
   (g) a control unit (12) for controlling said control valve in response to the output of said oxygen sensor to adjust the exhaust gas recirculation rate to a desired value; and
   (h) means for introducing air as a reference gas to a reference air chamber (5) of said oxygen sensor from a point upstream of said opening (13) but downstream of said throttle valve (3: 19,20) such that said reference air is at substantially the same pressure as that of said mixed gas in said intake duct but free from any of said recirculated exhaust gas.

3. A control system as claimed in claim 2, wherein said introducing means comprises a passage (14) establishing open communication between said point and said reference chamber (5) of the oxygen sensor.

4. A control system as claimed in claim 2, wherein said introducing means comprises a partition member (18) dividing said intake duct into a first flow path (16) for pure intake air and a second flow path (17) for the mixed gas; and said oxygen sensor is mounted on the partition member between said paths with said reference air chamber (5) of said sensor in open communication with said first path.

* * * * *